No. 861,577. PATENTED JULY 30, 1907.
P. DOSCH.
WIRE STUD.
APPLICATION FILED OCT. 12, 1906.

WITNESSES
H. A. Lamb
M. J. Lougden

INVENTOR
Peter Dosch
BY
ATTORNEY

UNITED STATES PATENT OFFICE.

PETER DOSCH, OF BRIDGEPORT, CONNECTICUT.

WIRE STUD.

No. 861,577.  Specification of Letters Patent.  Patented July 30, 1907.

Application filed October 12, 1906. Serial No. 338,642.

*To all whom it may concern:*

Be it known that I, PETER DOSCH, a citizen of the United States, residing at Bridgeport, in the county of Fairfield and State of Connecticut, have invented certain new and useful Improvements in Wire Studs; and I do hereby declare the following to be a full, clear, and exact description of the invention, such as will enable others skilled in the art to which it appertains to make and use the same.

My invention relates to the manufacture of studs such as are commonly used by laundrymen in the buttonholes of shirts, and consists in certain details of construction hereinafter fully set forth and then particularly pointed out in the claims which conclude this application.

The object of my invention is to provide a stud of this description which shall be very cheap and simple and which can readily be inserted within and withdrawn from the buttonhole of a shirt.

Figure 1:
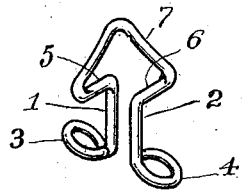
Figure 2:
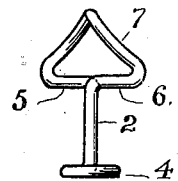
Figure 3:
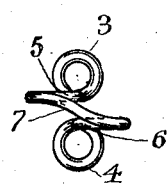

In the accompanying drawing Figure 1 is a perspective view illustrating my improvement—Fig. 2 a side elevation thereof, and Fig. 3 a plan view.

Similar numbers of reference denote like parts in the several figures of the drawing.

My improved shirt stud is made from a single piece of wire bent in such manner as to give the required shape and will be best understood from the following description.

In constructing my improvement I utilize a single piece of wire, which is bent so as to form two shank-like portions 1, 2, the ends of the wire being bent in the same horizontal plane and at right angles to the shanks so as to afford base portions 3, 4. At the upper ends of the shanks 1, 2, the wire is offset at right angles in opposite directions as shown at 5, 6, and the closed or loop end 7 of the wire is disposed in a plane substantially at right angles to said base portions and connects these offset portions, this closed or loop end being preferably given a helical twist as shown in the drawing, so that the insertion and withdrawal of the stud is accomplished with a screw action.

The shanks 1, 2, are parallel with each other and are preferably separated by an intervening space so that the insertion and withdrawal of the stud is effected with a slight spring action.

My improved stud possesses a marked advantage over the ordinary wooden stud commonly used by laundrymen in that it may be made very cheaply and without waste of material and can be inserted within and withdrawn from the buttonholes very readily and without injury to the latter.

I claim

1. A shirt stud made from a single piece of wire whose extremities are bent in the same horizontal plane to form a base, the sections of said wire adjoining the base portions extending in parallelism at right angles to said portions to form the shank of the stud, said sections being offset at substantially right angles at their upper portions, and a loop portion connecting the said offset portions and disposed virtually in a plane substantially at right angles to said base portions to form the head of the stud.

2. A shirt stud made from a single piece of wire whose free ends are parallel to form a shank while the extremities are bent at right angles to the shank portions to form base portions, the upper ends of said shank portions being offset in opposite directions and connected by the loop or closed portion of the wire virtually in a plane substantially at right angles to the plane of said base portions to form the head of the stud.

3. A shirt stud made from a single piece of wire whose free ends are parallel to form a shank while the extremities are bent at right angles to the shank portions to form base portions, the upper ends of said shank portions being offset in opposite directions while the closed or loop portion of the wire is disposed in a double helix and adjoins said offset portions.

4. A stud made from a single piece of wire doubled to form two parallel shank portions, the ends being bent at right angles in the same plane to form the base of the stud, while the closed end is bent into a head which extends virtually in a plane substantially at right angles to the plane of said base.

In testimony whereof I affix my signature in presence of two witnesses.

PETER DOSCH.

Witnesses:
F. W. SMITH, Jr.,
M. T. LONGDEN.